Patented Aug. 30, 1938

2,128,654

UNITED STATES PATENT OFFICE

2,128,654

SOLUTIONS OF VULCANIZED RUBBER IN ORGANIC SOLVENTS OF FINE COLLOIDAL UP TO MOLECULAR DISPERSION AND THE PROCESS OF MAKING THOSE SOLUTIONS

Nikolaus Lebedenko, Max Naphtali, Nicolaus Kroll, and Hermann Meyer, Berlin, Germany, assignors to Commercial Ingredients Corporation, New York, N. Y., a corporation of New York No Drawing. Application March 14, 1933, Serial No. 660,694. In Germany March 15, 1932

5 Claims. (Cl. 18—50)

Our invention relates to the preparation of solutions of finely divided up to molecular dispersion of vulcanized rubber and to processes for making such solutions.

There have been several attempts to obtain such solutions of vulcanized rubber as will be pointed out in certain of the published art discussed below. However, these attempts have not given a satisfactory product and have resulted either in a material which has not the desirable adhesive, resilient and flowing characteristics, or else the vulcanite was in such a low concentration, say 2 or 3%, in the solution as to make it of no value commercially. By means of our process we have produced a solution of vulcanite which has overcome all of these disadvantages. A fine colloidal or down to a molecular dispersion of vulcanized rubber in relatively concentrated form is obtained in a solution and which vulcanite has also all of the desired properties as to adhesiveness, resiliency, flow and stability, as well as other desirable properties.

The scientific work of Wrück, Inaug. Diss "Beiträge zur Theorie der Heissvulkanisation des Kautschuks", is the first to disclose an attempt to vulcanize rubber in solution. Wrück dissolved rubber in pseudocumene and vulcanized it at the boiling temperature of pseudocumene, in order to explain the processes of vulcanization.

The English Patent No. 164,770 discusses the processes of making pastes and highly viscous solutions of rubber vulcanite containing sulfur up to 4%. By these processes generally, gels are produced which through various disintegration means are reduced to pastes and suspensions. These suspensions erroneously are called solutions. Furthermore the rubber containing 6% combined sulfur changes into a solid mass which is not dispersible in solvents. On the other hand, the products obtained from this process cannot be used for many purposes because of their low degree of vulcanization.

The French Patent No. 583,861 describes experiments by which gels or pulverized sediments are produced when the dispersion contains rubber up to 12%, and 40–50% sulfur—calculated to rubber—added. It is possible to get the vulcanite in solution which in reality is a pseudo solution only under the following complexed conditions: The concentration of the vulcanite in solution must be reduced to 2–3%; the rubber must be swelled by means of a high boiling point solvent, for example, nitrobenzol; the rubber must also be depolymerized by a long heating, 10 hours at 120°, (Example 3); the vulcanization must take place for at least ten hours and usually considerably longer and finally high temperatures must be used, for example, 150° C. Even after carrying out all these instructions and maintaining the several conditions specified, it will be noted that the concentration of the vulcanite is only 2–3% which is so low as to be uneconomical to produce commercially. That 2–3% vulcanite is the maximum concentration obtainable by the process outlined in this disclosure is indicated by another similar experiment recited therein which differs from the experiment just discussed in that a higher concentration of vulcanite and a lower amount of depolymerization of the rubber swelling before the vulcanization is carried out. Under these conditions it was found that the vulcanite precipitated.

The English Patent No. 243,966 is based also on the employment of high boiling point and aromatic solvents, principally solvent-naphtha, and sufficient sulfur is used to give a vulcanite containing at least 15% combined sulfur. Rubber which has been previously vulcanized is employed.

The experiments which are the basis of this British patent have shown that it is possible to gain solutions of vulcanite of each sulfur-content, if before and during the vulcanization the solution is heated long enough and practical accelerators are used, and if only such solvents are employed whose boiling-points are higher than 140°. These solutions, however, tend to produce gels or pseudogels; consequently they cannot be considered as highly dispersed up to molecular solutions. Such solutions permeated with pseudogel are not fit for painting. Also they flow badly, dry very slowly, are brittle, and their evaporated residues have an adhesiveness which is not satisfactory.

It is desired to obtain a constant vulcanization solution which does not gelatinize and which has the property of quickly drying. This means that low boiling point solvents must be used, that is, those in which the greater part evaporates below 100–110° C. However, the following difficulties thereupon arise for if a 10% rubber solution in mixtures of benzol or its homologues, toluol and xylol, or in gasoline, in addition to small quantities of aromatics is vulcanized with sulphur, a gel condition arises in all cases. This is true even if there is a small amount of combined sulphur present. The addition of more solvent only tends to promote the formation of gels and even the employment of rapid accelerators, such as xanthogenates, do not inhibit the formation of gels but, on the contrary, sometimes cause the appearance of even more compact gels.

By the invention in question it is possible to produce solutions of vulcanized rubber in fine colloidal down to molecular dispersion in organic solvents and in a concentration which satisfies the technical requirements. Also the rubber contains combined sulfur in every desired quantity. These solutions are thoroughly stable. Neither by changing the concentration, nor by storing them under chemically neutral conditions do these solutions separate gels or pseudogels or even sediments of vulcanite.

As a result of our invention we are able to produce fine colloidal down to molecular constant dispersions of rubber vulcanite in organic solvents. We have found that such solutions may be obtained by the chemical breaking down of the gels arising intermediately. The breaking down of these gels takes place best in their nascent state.

One of the bases for obtaining highly dispersed down to molecular solutions has as an hypothesis the formation of bodies readily soluble which have a suitably low molecular weight or relatively low molecular aggregation. The vulcanization of swelled raw rubber of every quality and source, for example, smoked sheets, proceeds immediately upon the increasing of the size of the large rubber molecule. This increase in molecular size is manifested by a marked change in solubility which means, according to the intensity with which the operation is carried out, the formation of pseudogels, reversible gels, irreversible gels, and firm compact precipitates.

We have set forth in more detail below a theoretical basis for the results obtained by our process although, however, we do not wish to be limited by this theory in the scope of our invention. The conversion of the intermediately formed gel which is continually formed during the vulcanization of the rubber products into easily soluble products is achieved by the present process by means of the chemical decomposition of these intermediate products of vulcanization in a nascent state.

It has been found expedient to maintain a slightly alkaline condition during this reaction. The decomposition of the gels occurs through the influence of sulphur extracting compounds upon them and, as already stated, it has been found that they are acted upon most easily when in the nascent state. Such sulphur extracting compounds promote the solubility of the vulcanite in its final state especially after they have taken up sulphur. This may be due to their chemical similarity with the vulcanite to be dissolved.

As to those substances absorbing sulfur and promoting the solubility, the low boiling point cracked products of the oil refining which are rich in double bond compounds and therefore able to absorb sulfur are important.

Experiences teach and calculations confirm, that it is suitable to make use of such a quantity of unsaturated or cracked products which is able to absorb the third part of the added sulfur. The unsaturated products should be so chosen that neither they nor the sulfur-compounds arising from them in the course of the vulcanization elevate the boiling point of the solvent mixture higher than approximately 145°.

In carrying out our process it will be found that after a short vulcanization and with the use of proportionately low temperatures dependent upon the type of accelerator, a vulcanite is obtained with any desired degree of vulcanization and in a highly dispersed down to molecular solution and, furthermore, one which, if desired, is free from uncombined sulphur.

We have indicated below by examples various methods by which our process may be carried out. These examples, however, are for the purposes of illustration only and we do not wish to be limited thereby.

Example 1

2 kg. para-rubber (smoked sheets) are swelled in a mixture of 1 kg. xylol, 3 kg. toluol, and 10 kg. cracked benzine with the iodine number 50. The solution must be heated at 120° in a pressure vessel. The time required is 1½–2 hours. Then 0.2 kg. sulfurflower, 0.02 kg. hexamethylenetetramin and 0.02 kg. zinc oxide is added. The temperature is raised to 140–145°. At this temperature vulcanization takes place for 2½–3 hours, while constantly stirring mechanically.

During the vulcanization the whole substance thickens to a spongy gel, which has 7–7.5% sulfur and the pressure rises considerably. During this state the stirring becomes difficult, but from 15 to 20 minutes after this condition arises the substance suddenly changes to a more liquid condition, the pressure diminishes and becomes less than before the vulcanization. The vulcanite resulting contains 6.4–6.7% combined sulfur.

If the vulcanization of rubber is carried out in a solvent of saturate character, then foreign substances may be added to the solvent which possesses sufficient affinity for sulphur under the conditions obtaining during the vulcanization to withdraw the proper quantities of sulphur and convert the vulcanite to an easily soluble form. Such substances are for this purpose so selected that their sulphur products either are soluble in the whole solution of the vulcanite and are amorphous or dispersible in the residue remaining after evaporation or are separable as insoluble precipitates which do not carry down other dissolved substances.

For this purpose the use of unsaturated acids, for example crotonic acid, has been found to be advantageous. Since we have found that to best carry out the vulcanization the entire charge must have a basic reaction it is necessary to neutralize the acids so used with organic or inorganic bases, such as for example, zinc oxide. It has been found that the intended effect is considerably increased if such acids are converted into metal salts, preferably zinc, lead, or magnesium salts.

It is advantageous to use even a surplus of basic substances. The qualitative and quantitative selections of those ingredients depends upon the amount of sulfur which is to be absorbed, upon the solubility of the sulfur-compounds and salts in the mass, and last upon the residues remaining after evaporating, or the characteristics of the precipitates so formed.

Example 2

2 kg. para-rubber are dissolved in a mixture of 1 kg. xylol, 3 kg. toluol, and 10 kg. aviation benzine (iodine number 0–3), with the addition of 0.01 kg. zinc oxide and 0.01 kg. crotonic acid and heating at 120°. It will take 1½ hours. Then 0.2 kg. sulfurflower, 0.02 kg. hexamethylenetetramin, 0.08 kg. crotonic acid, and 0.05 kg. zinc oxide are added and the temperature is elevated to 140–145°. At this temperature the rubber solution is vulcanized for 2½–3 hours, while constantly stirring mechanically.

By this mode of operation no thickening or at least only a slight amount of increased viscosity is observed in the charge. The pressure of the vapour, too, lessens very gradually during the course of the breaking down of the intermediary products. As in Example 1, it is advantageous to absorb by suitable chemicals, or to blow away vapours of ammonia or ammonium sulphide which may be formed.

If the complete combination of the sulphur not required for the final vulcanite by means of solvent or by means of other added ingredients is not desirable, then such sulphur can be removed if necessary by the combination of all suitable substances with the addition of vulcanization accelerators.

*Example 3*

2 kg. para-rubber are swelled in 1 kg. xylol, 3 kg. toluol, 6 kg. gasoline (iodine number 50), 5 kg. gasoline (iodine number 0–3), and 0.02 kg. zinc oxide and 0.02 kg. crotonic acid are added. The whole mass is heated to 120° or so, while constantly stirring the mass for 1 hour.

For the vulcanization 0.25 kg. sulfur, 0.03 kg. zinc oxide, 0.03 kg. crotonic acid, and 0.02 kg. hexamethylenetetramin are added and heated at 145°. After 1 hour the vulcanization produces a spongy gel which begins to be broken down at once by the zinc crotonate. After 2 or 3 hours a solution is formed having a low viscosity and containing a highly dispersed down to molecularly dissolved vulcanite with 8–9% combined sulfur. During the decomposition, it is noted that the pressure on the container drops 1 to 1½ atmospheres.

A further important technical advantage of our process is the condition which permits the freeing of the vulcanized ruber dispersion from the sulphur which did not enter into the vulcanization process or the replacing of it by selenium for example. This is important due to the fact that sulphur in rubber tends to become oxidized to sulphurous acid in the course of time and this resulting condition diminishes the durability of rubber articles in which it has been formed.

We have found that sulphur can be separated from the dispersion by activated metals, e. g., amalgamated copper, especially those with an extended surface, such as foil, or wire gauze. A second method for separating the sulfur from the dispersion consists in allowing the hot vulcanized solution to cool slowly, while stirring it with metal plates or gratings, which are covered with sulfur-crystals or substances isotropically crystallized. Instead of the mentioned crystallization centres any otherwise formed can be used with the same success.

For certain purposes the vulcanized rubber solutions can be considerably improved by precipitating the rubber with acetone, methanol, etc., whereby resins, albumins, and uncombined sulfur remain in solution. The precipitated and cleaned material may then be absorbed in any solvent, e. g., gasoline. Through repetition this process permits a still further cleaning and improving of the quality. If one applies different agents for precipitation to the dispersion one after another, e. g., the series: acetone, methanol, diluted mineral-acid, it is possible to obtain different types of precipitates which can then be collected and further worked according to their respective qualities, or they may be blended together. The dissolving and precipitating processes are preferably carried out at rather elevated temperatures. The vulcanization solutions more or less purified in the manners described above may be used with particular advantage where any trace of free sulphur would be injurious.

The products obtained by carrying out the process of the present invention can be regarded as primordial materials for the production of technical articles. These solutions can be applied especially advantageously as prime and cover paints and agglutinants, adding suitable substances to the solution. These products are distinguished by their soft rubber character and their molecular dispersion.

Also hygienic articles consisting of very thin vulcanized rubber can be produced easily in the above mentioned way, and furthermore they do not share the great hygienic dangers of the cold vulcanization.

The quantitative relationship of the agencies taking part in the reaction and the distribution of the sulphur among the ingredients of the charge (rubber, solvent, and adjuvivants) in the periods of time which correspond to the different vulcanization phases corresponds to the stoichiometric quantitative relations as they are calculated on the hypothesis of the formation of intermediary rubber thiozonides. Moreover, this hypothesis is confirmed by the fact that the highest content of combined sulphur is absorbed in that reaction phase which manifests itself as an entirely insoluble gel. In the course of the subsequent decomposition attending the liquefication of the charge the content of the combined sulphur in certain cases fell to two-thirds of the original quantity introduced. The rapidity of both reactions depends principally upon the temperature prevailing, the pressure, the intensity of the agitation and the reactivity of the sulphur withdrawing agents employed.

While we have disclosed only relatively specific means for carrying out our process and producing our product, we do not wish to be limited thereto. Other modifications of our invention than those herein disclosed may become apparent to those skilled in the art and we desire therefore to be limited only by prior art and the appended claims.

We claim:

1. The method of producing a dispersion of vulcanized rubber, comprising dissolving the rubber in a solvent containing unsaturated organic compounds capable of absorbing sulphur, and while maintaining the solution in an alkaline condition, heating the mixture to produce vulcanization of the rubber.

2. The method for producing a dispersion of vulcanized rubber comprising swelling para rubber in a mixture of unsaturated cracked benzine and an additional solvent, heating the solution to 120° C. for approximately two hours, adding sulphur and zinc oxide, raising the temperature to approximately 145° C. for approximately three hours while stirring mechanically.

3. The method for producing a dispersion of vulcanized rubber in a solvent comprising heating raw rubber to about 120° C. with a mixture of rubber solvent, crotonic acid and zinc oxide, adding sulphur to said mixture and heating to approximately 145° C. for three hours while stirring slowly.

4. In a method of producing a dispersion of vulcanized rubber in a solvent, the step of disintegrating intermediately formed gels with a light petroleum hydrocarbon distillate containing unsaturated compounds and having an iodine value of about 50.

5. A method of producing a dispersion of vulcanized rubber in a solvent comprising mixing the rubber to be dispersed with a swelling agent and benzine produced by a cracking operation and having an iodine value of about 50, adding sulphur to the resulting mixture, and heating the mixture to produce vulcanization of the rubber.

NIKOLAUS LEBEDENKO.
MAX NAPHTALI.
NICOLAUS KROLL.
HERMANN MEYER.